United States Patent
Ahern et al.

(10) Patent No.: US 8,291,140 B2
(45) Date of Patent: *Oct. 16, 2012

(54) COMPUTING MODULE WITH SERIAL DATA CONNECTIVITY

(76) Inventors: Frank W. Ahern, Scottsdale, AZ (US); Desi Rhoden, Phoenix, AZ (US); Jeff Doss, Phoenix, AZ (US); Charles Mollo, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/240,773

(22) Filed: Sep. 22, 2011

(65) Prior Publication Data

US 2012/0017023 A1    Jan. 19, 2012

Related U.S. Application Data

(63) Continuation of application No. 12/644,511, filed on Dec. 22, 2009, now Pat. No. 8,060,675, which is a continuation of application No. 11/300,131, filed on Dec. 13, 2005, now Pat. No. 7,657,678, which is a continuation of application No. 09/559,678, filed on Apr. 27, 2000, now Pat. No. 7,734,852, which is a continuation-in-part of application No. 09/130,057, filed on Aug. 6, 1998, now Pat. No. 6,088,752, and a continuation-in-part of application No. 09/130,058, filed on Aug. 6, 1998, now Pat. No. 6,070,214.

(60) Provisional application No. 60/198,317, filed on Apr. 19, 2000.

(51) Int. Cl.
 *G06F 13/00* (2006.01)
(52) U.S. Cl. .................................. 710/100; 710/305
(58) Field of Classification Search .......... 710/305–306, 710/100; 370/413
 See application file for complete search history.

(56) References Cited

U.S. PATENT DOCUMENTS 5,991,304 A * 11/1999 Abramson .................... 370/413

* cited by examiner

*Primary Examiner* — Brian Misiura
*Assistant Examiner* — Kim Huynh

(57) ABSTRACT

A computing module includes an interface to asynchronously, serially exchange parallel system bus data with one or more other modules of a computer system that includes the computing module. The computing module can asynchronously, serially transfer first parallel bus data to another module of the computer system, and can asynchronously, serially receive second parallel bus data from another module of the computer system.

11 Claims, 2 Drawing Sheets

COMPUTING MODULE WITH SERIAL DATA CONNECTIVITY

CROSS REFERENCE TO RELATED APPLICATIONS

This application is a Continuation of U.S. patent application Ser. No. 11/300,131, filed Dec. 13, 2005, which is hereby incorporated by reference herein. U.S. patent application Ser. No. 11/300,131 is a Continuation of U.S. patent application Ser. No. 09/559,678, filed Apr. 27, 2000, which is hereby incorporated by reference herein. U.S. patent application Ser. No. 09/559,678 claims the benefit of U.S. Provisional Application No. 60/198,317, filed Apr. 19, 2000, which is hereby incorporated by reference herein. U.S. patent application Ser. No. 09/559,678 is a continuation-in-part application of U.S. application Ser. No. 09/130,057, filed Aug. 6, 1998, now U.S. Pat. No. 6,088,752, which is hereby incorporated by reference herein. U.S. patent application Ser. No. 09/559,678 is also a continuation-in-part application of U.S. application Ser. No. 09/130,058 filed Aug. 6, 1998, now U.S. Pat. No. 6,070,214, which is hereby incorporated by reference herein. U.S. patent application Ser. No. 09/559,678 is also related to U.S. patent application Ser. No. 08/679,131, now U.S. Pat. No. 5,941,965, which is hereby incorporated by reference herein.

FIELD OF THE INVENTION

The present invention is generally related to computers and data processing systems, and more particularly to computer systems having at least one host processor and connectable to a plurality of peripherals, expansion devices, and/or other computers, including notebook and other portable and hand-held computers, storage devices, displays, USB, IEEE 1394, audio, keyboards, mice and so forth.

BACKGROUND OF THE INVENTION

Computer systems today are powerful, but are rendered limited in their ability to be divided into modular components due to a variety of technical limitations of today's PCI bus technology. And in their ability to adapt to changing computing environments. The PCI bus is pervasive in the industry, but as a parallel data bus is not easily extended over any distance or bridged to other remote PCI based devices due to loading and physical constraints, most notably the inability to extend the PCI bus more than a few inches. Full bridges are known, such as used in traditional laptop computer/docking stations. However, separating the laptop computer from the docking station a significant distance has not been possible. Moreover, the processing power of computer systems has been resident within the traditional computer used by the user because the microprocessor traditionally is directly connected to and resident on the PCI motherboard. Thus, upgrading processing power usually meant significant costs and/or replacing the computer or computer system.

PCI

The PCI bus is primarily a wide multiplexed address and data bus that provides support for everything from a single data word for every address to very long bursts of data words for a single address, with the implication being that burst data is intended for sequential addresses. Clearly the highest performance of the PCI bus comes from the bursts of data, however most PCI devices require reasonable performance for even the smallest single data word operations. Many PCI devices utilize only the single data mode for their transfers. In addition, starting with the implementation of the PCI 2.1 version of the specification, there has been at least pseudo isochronous behavior demanded from the bus placing limits on an individual device's utilization of the bus, thus virtually guaranteeing every device gets a dedicated segment of time on a very regular interval and within a relatively short time period. The fundamental reason behind such operation of the PCI bus is to enable such things as real time audio and video data streams to be mixed with other operations on the bus without introducing major conflicts or interruption of data output. Imagine spoken words being broken into small unconnected pieces and you get the picture. Prior to PCI 2.1 these artifacts could and did occur because devices could get on the bus and hold it for indefinite periods of time. Before modification of the spec for version 2.1, there really was no way to guarantee performance of devices on the bus, or to guarantee time slot intervals when devices would get on the bus. Purists may argue that PCI is still theoretically not an isochronous bus, but as in most things in PC engineering, it is close enough.

Traditional High Speed Serial

Typical high speed serial bus operation on the other hand allows the possibility of all sizes of data transfers across the bus like PCI, but it certainly favors the very long bursts of data unlike PCI. The typical operation of a serial bus includes an extensive header of information for every data transaction on the bus much like Ethernet, which requires on the order of 68 bytes of header of information for every data transaction regardless of length. In other words, every data transaction on Ethernet would have to include 68 bytes of data along with the header information just to approach 50% utilization of the bus. As it turns out Ethernet also requires some guaranteed dead time between operations to "mostly" prevent collisions from other Ethernet devices on the widely disperse bus, and that dead time further reduces the average performance.

The typical protocol for a serial bus is much the same as Ethernet with often much longer header information. Virtually all existing serial bus protocol implementations are very general and every block of data comes with everything needed to completely identify it. FiberChannel (FC) has such a robust protocol that virtually all other serial protocols can be transmitted across FC completely embedded within the FC protocol, sort of like including the complete family history along with object size, physical location within the room, room measurements, room number, street address, city, zip code, country, planet, galaxy, universe, ... etc. and of course all the same information about the destination location as well, even if all you want to do is move the object to the other side of the same room. Small transfers across many of these protocols, while possible, are extremely expensive from a bandwidth point of view and impractical in a bus applications where small transfers are common and would be disproportionally burdened with more high overhead than actual data transfer. Of course the possibility of isochronous operation on the more general serial bus is not very reasonable.

Recreating High Speed Serial for PCI

In creating the proprietary Split-Bridge™ technology, Mobility electronics of Phoenix Ariz., the present applicant, actually had to go back to the drawing board and design a far simpler serial protocol to allow a marriage to the PCI bus, because none of the existing implementations could coexist without substantial loss of performance. For a detailed discussion of Applicant's proprietary Split-Bridge™ technology, cross reference is made to Applicant's co-pending commonly assigned patent applications identified as Ser. Nos. 09/130,057 and 09/130,058 both filed Aug. 6, 1998, the teachings of each incorporated herein by reference. The Split- Bridge™ technology approach is essentially custom fit for PCI and very extensible to all the other peripheral bus protocols under discussion like PCIx, and LDT™ set forth by AMD Corporation. LDT requires a clock link in addition to its data links, and is intended primarily as a motherboard application, wherein Split-Bridge™ technology is primarily intended to enable remote bus recreation. As the speeds of motherboard buses continue to grow faster, Split-Bridge™ can be readily adapted to support these by increasing the serial bus speed and adding multiple pipes. Split-Bridge™ technology fundamentals are a natural for extending anything that exists within a computer. It basically uses a single-byte of overhead for 32 bits of data and address—actually less when you consider that byte enables, which are not really "overhead", are included as well.

Armed with the far simpler protocol, all of the attributes of the PCI bus are preserved and made transparent across a high speed serial link at much higher effective bandwidth than any existing serial protocol. The net result is the liberation of a widely used general purpose bus, and the new found ability to separate what were previously considered fundamental inseparable parts of a computer into separate locations. When the most technical reviewers grasp the magnitude of the invention, then the wheels start to turn and the discussions that follow open up a new wealth of opportunities. It now becomes reasonable to explore some of the old fundamentals, like peer-to-peer communication between computers that has been part of the basic PCI specification from the beginning, but never really feasible because of the physical limits of the bus prior to Split-Bridge™ technology. The simplified single-byte overhead also enables very efficient high speed communication between two computers and could easily be extended beyond PCI.

The proprietary Split-Bridge™ technology is clearly not "just another high speed link" and distinguishing features that make it different represent novel approaches to solving some long troublesome system architecture issues.

First of all is the splitting of a PCI bridge into two separate and distinct pieces. Conceptually, a PCI bridge was never intended to be resident in two separate modules or chips and no mechanism existed to allow the sharing of setup information across two separate and distinct devices. A PCI bridge requires a number of programmable registers that supply information to both ports of a typical device. For the purpose of the following discussion, the two ports are defined into a north and south segment of the complete bridge.

The north segment is typically the configuration port of choice and the south side merely takes the information from the registers on the north side and operates accordingly. The problem exists when the north and south portions are physically and spatially separated and none of the register information is available to the south side because all the registers are in the north chip. A typical system solution conceived by the applicant prior to the invention of Split-Bridge™ technology would have been to merely create a separate set of registers in the south chip for configuration of that port. However, merely creating a separate set of registers in the south port would still leave the set up of those registers to the initialization code of the operating system and hence would have required a change to the system software.

Split-Bridge™ technology, on the other hand, chose to make the physical splitting of the bridge into two separate and spaced devices "transparent" to the system software (in other words, no knowledge to the system software that two devices were in fact behaving as one bridge chip). In order to make the operations transparent, all accesses to the configuration space were encoded, serialized, and "echoed" across the serial link to a second set of relevant registers in the south side. Such transparent echo between halves of a PCI bridge or any other bus bridge is an innovation that significantly enhances the operation of the technology.

Secondly, the actual protocol in the Split-Bridge™ technology is quite unique and different from the typical state of the art for serial bus operations. Typically transfers are "packetized" into block transfers of variable length. The problem as it relates to PCI is that the complete length of a given transfer must be known before a transfer can start so the proper packet header may be sent.

Earlier attempts to accomplish anything similar to Split-Bridge™ technology failed because the PCI bus does not inherently know from one transaction to the next when, or if, a transfer will end or how long a block or burst of information will take. In essence the protocol for the parallel PCI bus (and all other parallel, and or real time busses for that matter) is incompatible with existing protocols for serial buses.

An innovative solution to the problem was to invent a protocol for the serial bus that more or less mimics the protocol on the PCI. With such an invention it is now possible to substantially improve the performance and real time operation here to for not possible with any existing serial bus protocol.

The 8 bit to 10 bit encoding of the data on the bus is not new, but follows existing published works. However, the direct sending of 32 bits of information along with the 4 bits of control or byte enables, along with an additional 4 bits of extension represents a 40 bit for every 36 bits of existing PCI data, address, and control or a flat 10% overhead regardless of the transfer size or duration, and this approach is new and revolutionary. Extending the 4 bit extension to 12 or more bits and including other functionality such as error correction or retransmit functionality is also within the scope of the Split-Bridge™ technology.

New Applications of the Split-Bridge™ Technology

Basic Split-Bridge™ technology was created for the purpose of allowing a low cost, high speed serial data communications between a parallel system bus and remote devices. By taking advantage of the standard and pervasive nature of the PCI bus in many other applications in computing, dramatic improvements in the price performance for other machines is realized. The present invention comprises a revolutionary application rendered possible due to the attributes of applicant's proprietary Split-Bridge™ technology.

SUMMARY

The present invention achieves technical advantages as a modular computer system having a universal connectivity station adapted to connect and route data via serial data links to a plurality of devices, these serial links and interfaces at each end thereof employing proprietary Split-Bridge™ technology disclosed and claimed in co-pending and commonly assigned patent applications identified as Ser. No. 09/130,057 and Ser. No. 09/130,058, the teachings of which are incorporated herein by reference.

The present invention derives technical advantages as a modular computer system by separating into two or more spatially separate and distinct pieces, a computer core and a universal connectivity station (UCS). The core is the performance module of the modular computer system and may include some or all of the central processing unit (CPU), memory, AGP Graphics, and System Bus Chip adapted to communicably couple these three together or in combination with other items. The UCS communicably couples the processor module via high speed serial links based on the proprietary Split-Bridge™ technology of Mobility Electronics of Phoenix Ariz., the applicant of the present invention, to other computers or to other individual modules such as storage modules including hard disk drives, a user interface module consisting of a keyboard, mouse, monitor and printer, as well as a LAN Module such as any Internet connection or another UCS, another UCS, audiovisual device, LAN storage just to name a few. In addition, the UCS is adapted to couple via a Split-Bridge™ technology serial link with a portable or handheld computer or device remotely located from the UCS but still functionally coupled to the modular computer system via the UCS. The UCS and associated Split-Bridge™ technology serial links are all transparent to the modules which can have parallel data busses including those based on PCI or Cardbus architectures.

The modular computer system of the present invention including the UCS is a novel approach to computer architecture and upgrade ability. Advantageously, the separate performance module may be selectively upgraded or modified as desired and as technology increases the performance of key components including microprocessor speed, standards, and architectures without necessitating the replacement or modification of the rest of the computer system. The UCS allows the performance module to be upgraded while the rest of the system devices coupled thereto do not need to be modified. Upgrading to single or multiple processors in the performance module or modules is readily possible. Whole organizations can standardize to a single UCS regardless of the type of performance or portability required by the users, thus addressing for the first time the means of systems level support. In security sensitivity environments, it is possible to separate the "stored media" or computer central processor, or any other component of the system and connectivity from the operators, and still maintain the speed element so important in today's businesses.

DETAILED DESCRIPTION

Figure 1:
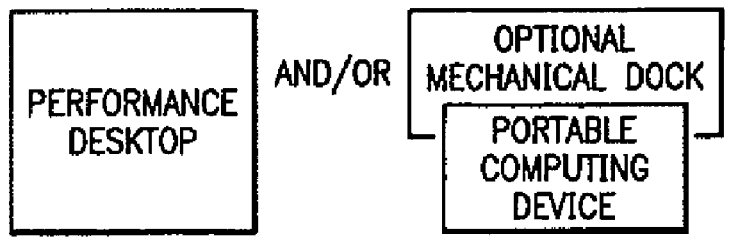
FIG. 1 illustrates prior art computer systems depicted as a traditional performance desk top computer shown at 10, and a portable computing device 12, such as a notebook or laptop computer, mechanically coupled to mechanical docking station 14.
Figure 2:
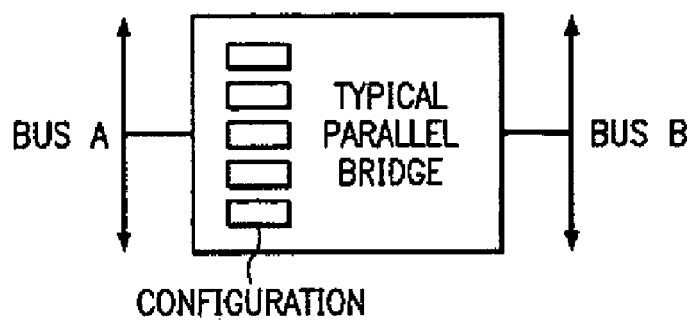
FIG. 2 is a block diagram of a prior art bridge 16 used to couple two system computing buses, such as used between the portable computing device 12 and the mechanical docking station 14 shown in FIG. 1.
Figure 3:
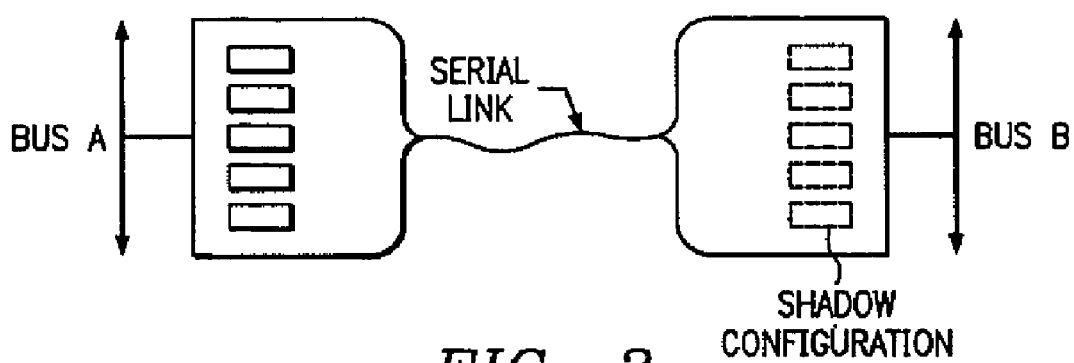
FIG. 3 illustrates the proprietary Split-Bridge™ technology serial communication technology of the applicant enabling high speed serial communications within the modular computer system of the present invention.

Referring to FIG. 3, there is depicted the proprietary Split-Bridge™ technology serial communications technology of the present applicant, discussed in great detail in commonly assigned U.S. patent application Ser. No. 09/130,057 filed Aug. 6, 1998, and Ser. No. 09/130,058 also filed Aug. 6, 1998 the teachings of which are incorporated herein by reference.

Applicant Split-Bridge™ technology revolutionizes the status quo for computer systems. The Split-Bridge™ technology does not require the need for custom hardware or custom software to achieve full performance serial communication between devices, including devices having parallel data buses including the PCI bus. In fact, for each device in a modular computer system, the Split-Bridge™ technology appears just like a standard PCI bridge, and all software operating systems and device drivers already take such standard devices into consideration. By utilizing standard buses within each device operating within the modular computer system, each device does not require any additional support from the Operating System (OS) software. The modular computing system has simple elegance, allowing the PCI bus which is so pervasive in the computer industry, that possible applications of the initial PCI form of Split-Bridge™ technology are all most limitless.

Originally implemented in PCI, there is nothing fundamental that ties the Split-Bridge™ technology to PCI, and thus, the Split-Bridge™ technology can migrate as bus architectures grow and migrate. The 64 bit PCI is compatible with the Split-Bridge™ technology, as is future PCIx and/or LDT or other bus technologies that are currently under consideration in the industry and which are straight forward transitions of the Split-Bridge™ technology. Implementations with other protocols or other possible and natural evolutions of the Split-Bridge™ technology, including digital video (DV) technology that can be streamed over the high-speed serial link.

Figure 4:
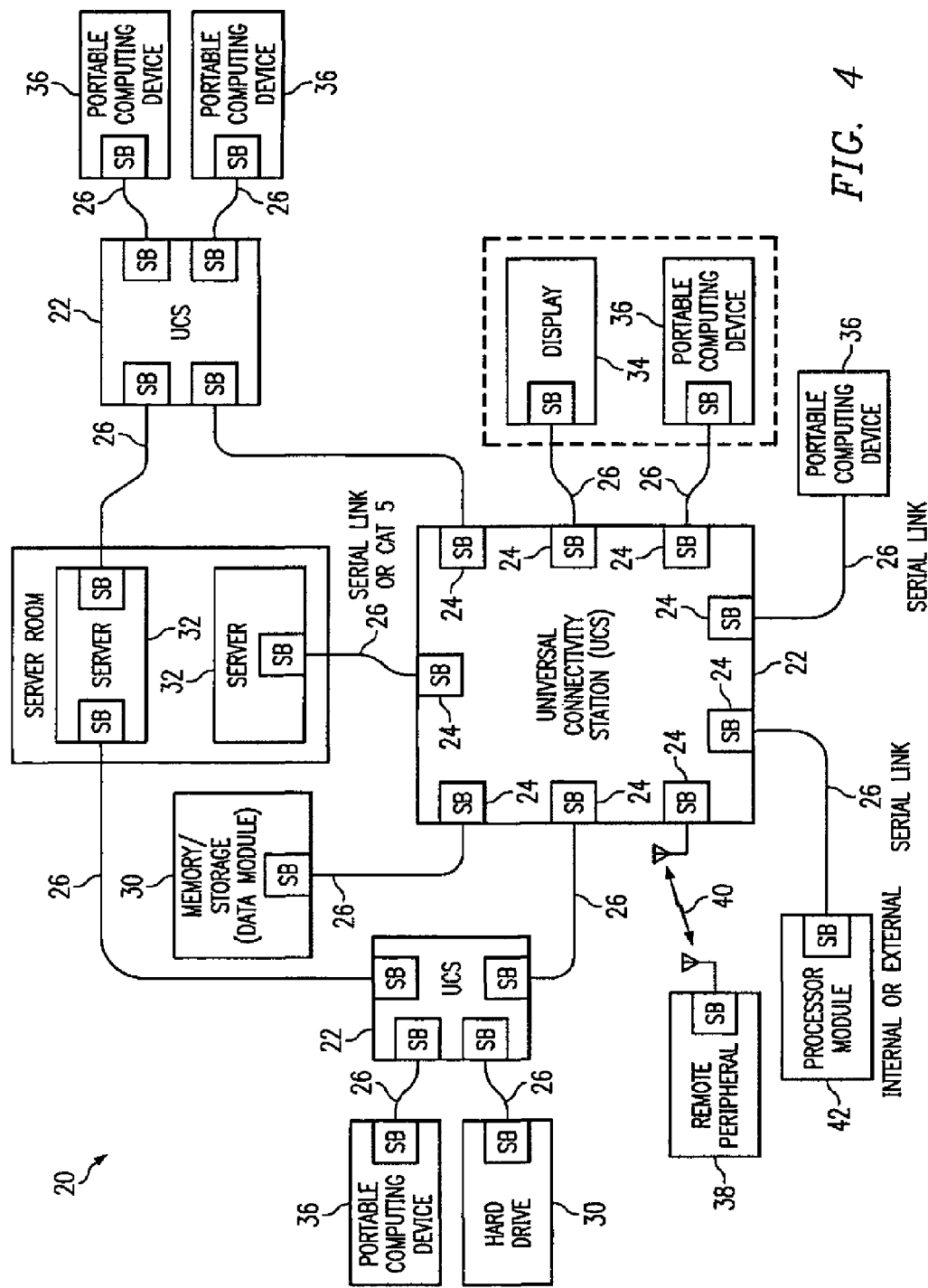
FIG. 4 is a block diagram of the modular computer system of the present invention utilizing a universal connectivity station (UCS) communicably coupled to a plurality of devices via serial links, such as the Split-Bridge™ technology serial links employed using fixed wire, optical, or wireless communication links.

Referring to FIG. 4, there is depicted at 20 a modular computer system according to one illustrative embodiment of the present invention. The modular computer system 20 is based around one or more universal connectivity stations generally shown at 22 each having a plurality of interface ports 24 which are preferably based on the proprietary Split-Bridge™ technology of the present applicant, Mobility Electronics of Phoenix Ariz. Each UCS 22 provides input/output, or I/O, capability of the computer or computer system 20, as well as modular expansion capability and features. UCS 22 includes all possible variations and combinations of port replication and connectivity, including but not limited to the following ports: P/S2, mouse and keyboard, serial, parallel, audio, USB, IEEE 1394, or firewire, SCSI, and the like. Each UCS 22 also includes the ability to expand the capability or features of the computer system 20 by adding any type of drive bays, including EIDE, USB, and 1394 CD Roms, DVD's, hard drives, tape back up's, ZIP Drives®, Jazz® drives, and the like.

A plurality of interconnecting and interactive devices are communicably coupled to each UCS 22 via respective high speed serial links generally shown at 26 based on the proprietary Split-Bridge™ technology. In the hardwire embodiment, the serial links 26 comprise of a pair of simplex links forms a duplex link interconnecting each end of the Split-Bridge™ technology interfaces as shown. The serial links 26 may also employ optical fiber and optical transceivers if desired. The various modules making up modular computer system 20 may include, and a plurality of, but are not limited to, a memory/storage device 30, servers 32 having one or multiple processors and possibly serving other UCS's 22, as shown, and modular computer systems, remote users and so forth, a display 34, a portable computing device 36, such as a notebook computer, a laptop computer, a portable digital assistant (FDA), and a remote wireless peripheral 38 which may interconnected via a wireless link shown at 40 and implementing the proprietary Split-Bridge™ technology. Examples of remote wireless terminals 38 may include 3rd generation (3G) devices now being developed and employed, including wireless personal devices having capabilities for voice, data, video and other forms of information which can be unidirectionally or bidirectionally streamed between the remote peripheral 38 and UCS 22. An appropriate antenna resides at each of the remote peripheral 38 and UCS 22 which are interconnected to respective transceivers communicably coupled to the respective ends of the Split-Bridge™ technology interfaces.

Moreover, multiple UCS's 22 can be integrated to communicate with each other via serially links 26, each UCS's 22 locally serving multiple modules. Multiple computers can be connected to a common UCS, or to multiple UCS's. For example, a computer or server room can have racks of computer processors or servers, each separately connected over a system of up to hundreds of feet, to one or many UCS's located throughout an office or other environment. This allows the desktop to have just a terminal or whatever capabilities the IT manager desires, enhancing security and control.

System 20 also provides the ability to simultaneously connect multiple computers 36 and allows full peer-to-peer communications, allowing the processor module (CPU) 42 to communicate with the portable device computer 36 or to the computer room computers 32, allowing all of these computers to share information and processing capability. This also allows certain of the computers, such as the portable computer 36, to upgrade its processing capability when it is connected to the UCS 22 with other higher capability computers.

Still referring to FIG. 4, the modular computer system 20 of the present invention further comprises a processor module 42, which may be remotely positioned from the UCS 22, but for purposes of inclusion, could internally reside with the UCS 22. The processor module 42, from a performance point of view, is the heart and sole of the modular computer system 20 and can be made up of one or more core parts including: the CPU, memory, APG Graphics, and a system bus interface to connect the other 3 together. The processor module 42 operates in conjunction with memory such as a hard disk drive, which can reside within the processor module 42, or be remotely located as shown at 30 if desired. The APG Graphics could be located separately within the system and interconnected via a serial link 26, or even located within UCS 22 if desired.

Advantageously, the processor module 42 which may comprise of a high speed microprocessor or microprocessors, digital signal processors (DSP's), and can be upgraded or interchanged from the systems 20 without effecting the other devices or operation of the system, thereby permitting increased performance at a very low cost. Computers today typically require the replacement or upgrading of other devices when the performance portion of the computer system is replaced. The modular computer system 20 of the present invention revolutionizes the computer architectures available by separating out the processor module 42 from the rest of the computer system 20. Each of the modules 30,32, 34,36, and 38 all have functional access and use of the processor module 42 via the UCS 22 over the respective serial links 26 and 40, and from a performance point of view, appear to each of these devices to be hardwired to the processor module 42. That is, the Split-Bridge™ technology links interconnecting each of the devices via the UCS 22 to the processor module 42 is transparent to each device, thus requiring no change to the OS of each device, the format of data transfer therebetween, or any other changes. This is rendered possible by the revolutionary Split-Bridge™ technology.

Another advantage of computer system 20 is that the data module 30 may be customized, portable, and used only by one user. This allows the user to take the portable module 30 with them from location to location, system 20 to system 20. The data module 30 can store each user's unique information, and can be accessed and used on any processor module 42 and UCS 22.

As discussed in considerable detail in the cross-referenced and commonly assigned patent applications, the Split-Bridge™ technology provides that information from the parallel buses of each device be first loaded into first-in first-out (FIFO) registers before being serialized into frames for transmission over the high speed serial link. Received frames are deserialized and loaded into FIFO registers at the other end thereof, such as UCS 22, for being placed onto the destination bus of the opposing device. Interrupts, error signals and status signals are sent along the serial link. Briefly, the proprietary Split-Bridge™ technology takes address and data from a bus, one transaction at a time, together with 4 bits that act either as control or byte enable signals. Two or more additional bits may be added to tag each transaction as either an addressing cycle, an acknowledging of a non-posted write, a data burst, end of data burst or cycle. If these transactions are posted writes they can be rapidly stored in a FIFO register before being encoded into a number of frames that are sent serially over the link. When pre-fetched reads are allowed, the FIFO register can store pre-fetched data in case the initiator requests it. For single cycle writes or other transactions that must await a response, the bridge can immediately signal the initiator to retry the request, even before the request is passed to the target.

In the preferred embodiment of the modular computer system of the present invention, one or more of the busses in the plurality of devices, as well as in the UCS 22, employ the PCI or PCMCIA standard, although it is contemplated that other bus standards can be used as well. The preferred Split-Bridges™ technology operates with a plurality of configuration registers that is loaded with information specified under the PCI standard. The Split-Bridges™ technology transfers information between busses depending on whether the pending address falls within a range embraced by the configuration registers. This scheme works with devices on the other side of the Split-Bridge™ technology, which can be given unique base addresses to avoid addressing conflicts.

As disclosed in great detail in the co-pending and cross-referenced commonly assigned patent applications, the Split-Bridges™ technology may be formed as two separate application-specific integrated circuits (ASICs) joined by a duplex link formed as a pair of simplex links. Preferably, these two integrated ASICs have the same structure, but can act in two different modes in response to a control signal applied to one of its pins. Working with hierarchical busses (primary and secondary busses) these integrated circuits are placed in a mode appropriate for its associated bus. The ASIC associated with the secondary bus preferably has an arbitrator that can grant masters control of the secondary bus. The ASIC can also supply a number of ports to support other devices such as a USB and generic configurable I/O ports, as well as parallel and serial ports.

The UCS preferably comprises a PCI bus having a plurality of PC card slots located with the UCS housing. Each PC card slot is provided with a Split-Bridge™ technology interface, and preferably one of the ASICs assembled with a standardized serial connector comprising at least 4 pins, as depicted in the cross referenced commonly assigned patent applications, the teachings of which are incorporated herein by reference.

The modular computer system 20 of the present invention derives technical advantages in that the UCS station 22 with its associated interface cards and parallel data bus interconnecting each interface card, is truly functionally transparent to each of the interconnected modules including the memory storage device 30, the server 32, the display 34, the portable computing device 36, the remote wireless peripheral 38, and the processor module 42. This integration of devices into a modular computer system has truly enormous potential and uses depending on the desired needs and requirements of one's computing system. However, the physical location and proximity of each of the devices forming the modular computer system are no longer strictly limited due to the high speed serial interconnection links of the proprietary Split-Bridge™ technology. Each of the devices can be remotely located, or located in proximity to one another as desired. For instance, the display 34 and portable computing device 36 may be resident within one's office, with the UCS 22 in another room, and with the memory storage device 30, server 32, and performance module 42 remotely located in yet still another room or location. Moreover, a plurality of portable computing devices 36 can all be remotely located from UCS 22, and from each other, allowing networking to modular system 20 either through wireless serial links as depicted at 26, or wirelessly as depicted at 40.

The proprietary Split-Bridge™ technology presently allows for extended communication distances of 5 meters, but through advancement in technology can continue to be extended. For instance, using optical communication links in place of copper wire simplex links, along with suitable optical transceivers, can yield links that are exceptionally long. Using wireless technology, as depicted at 40, allows a remote peripheral 38 to be located perhaps anywhere in the world, such as by implementing repeaters incorporating the proprietary Split-Bridge™ technology high speed serial communication technology. Additional techniques can be used by slowing the transfer rate, and increasing the number of pipes, to achieve link distances of hundreds of feet, and allowing the use of CAT5 cable.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An apparatus comprising:
    a processor;
    a first parallel bus; and
    an interface configured to receive parallel data from the first parallel bus and configured to asynchronously, serially exchange serial data, corresponding to the parallel data, with a second module configured to communicate peripherally over a second parallel bus without requiring handshaking.

2. The apparatus as recited in claim 1, wherein the interface comprises a bridge.

3. The apparatus as recited in claim 1, wherein a computing first module is separated from each of the one or more modules by a distance of at least a meter.

4. The apparatus as recited in claim 1, wherein the one or more modules include one or more of: a disk drive, a keyboard, a mouse, a monitor, a printer, an Internet connection, a wireless accessory, or a storage module.

5. The apparatus as recited in claim 1, further comprising:
    a first module comprising a processor module including a CPU and memory; and
    a second module receiving said serial data from said first module via a serial link, wherein said second module comprises a peripheral device.

6. The apparatus as recited in claim 5, wherein said peripheral device comprises a hard drive.

7. The apparatus as recited in claim 5, wherein said first and second module each comprises a portable computing device.

8. The apparatus as recited in claim 5, wherein said first module comprises a memory device.

9. The apparatus as recited in claim 5, wherein said peripheral device is configured to generate a clock signal from the received serial data.

10. The apparatus as recited in claim 5, further comprising:
    a second interface at said peripheral device configured to receive second parallel data from a second parallel bus and configured to asynchronously, serially exchange second serial data, corresponding to the second parallel data with said first module without requiring handshaking.

11. The apparatus as recited in claim 10, wherein said first module is configured to generate a clock signal from the received second serial data.

\* \* \* \* \*

UNITED STATES PATENT AND TRADEMARK OFFICE
CERTIFICATE OF CORRECTION

PATENT NO. : 8,291,140 B2  
APPLICATION NO. : 13/240773  
DATED : October 16, 2012  
INVENTOR(S) : Ahern et al.

Page 1 of 1

It is certified that error appears in the above-identified patent and that said Letters Patent is hereby corrected as shown below:

In Column 2, Line 40, delete "FiberChannel" and insert -- Fiber Channel --, therefor.

In Column 2, Line 46, delete "etc." and insert -- etc., --, therefor.

In Column 6, Line 46, delete "CD Roms," and insert -- CD ROMs, --, therefor.

In Column 9, Line 39, delete "CATS" and insert -- CAT5 --, therefor.

Signed and Sealed this  
Ninth Day of April, 2013

Teresa Stanek Rea  
*Acting Director of the United States Patent and Trademark Office*